United States Patent [19]

Aykut

[11] 4,223,777
[45] Sep. 23, 1980

[54] METHOD AND APPARATUS FOR TRANSPORTING STACKS OF PAPER SHEETS OR THE LIKE BETWEEN PRODUCING AND PROCESSING MACHINES

[75] Inventor: Kurt Aykut, Hamburg, Fed. Rep. of Germany

[73] Assignee: E. C. H. Will (GmbH & Co.), Hamburg, Fed. Rep. of Germany

[21] Appl. No.: 877,828

[22] Filed: Feb. 8, 1978

[30] Foreign Application Priority Data

Feb. 25, 1977 [DE] Fed. Rep. of Germany ....... 2708131

[51] Int. Cl.² ............................................. B65G 47/68
[52] U.S. Cl. ..................................... 198/365; 198/448
[58] Field of Search .............. 198/358, 365, 444, 448, 198/449; 271/184, 225

[56] References Cited

U.S. PATENT DOCUMENTS

| | | | |
|---|---|---|---|
| 2,819,786 | 1/1958 | Walters | 198/358 |
| 3,608,698 | 9/1971 | Crall | 198/358 |
| 3,693,776 | 9/1972 | Harrison | 198/448 |
| 3,986,596 | 10/1976 | Hamilton | 198/365 |

FOREIGN PATENT DOCUMENTS

2531967  2/1976  Fed. Rep. of Germany .......... 198/358

*Primary Examiner*—Jeffrey V. Nase

*Attorney, Agent, or Firm*—Peter K. Kontler

[57] ABSTRACT

Apparatus for transporting stacks of paper sheets from a gathering station which receives successive rows of aligned stacks to two packing machines has a discrete staggering conveyor for each stack of a row. These conveyors serve to convert each row into two groups of staggered stacks and cooperate with auxiliary conveyors which deliver such stacks to successive pallets of two separate sets of pallets which advance the stacks toward the respective packing machines. The pallets of each set travel along a separate main track. The main tracks are parallel to each other and flank two crossing connecting tracks. When a packing machine is idle, the rate of delivery of rows of stacks to the gathering station is reduced in half and the pallets which normally advance along the respective main track are diverted onto one of the connecting tracks which guides them sufficiently close to the pallets of the other set to shuffle the two files of stacks so that the resulting single file of stacks can be transported to the active packing machine. To this end, the pallets of one set are staggered with respect to the pallets of the other set, and the pallets of each set are separated from each other by gaps each of which is wide enough to receive a pallet. The pallets are slidable along motion transmitting rods which are mounted on two parallel chains and extend transversely of the main tracks.

12 Claims, 4 Drawing Figures

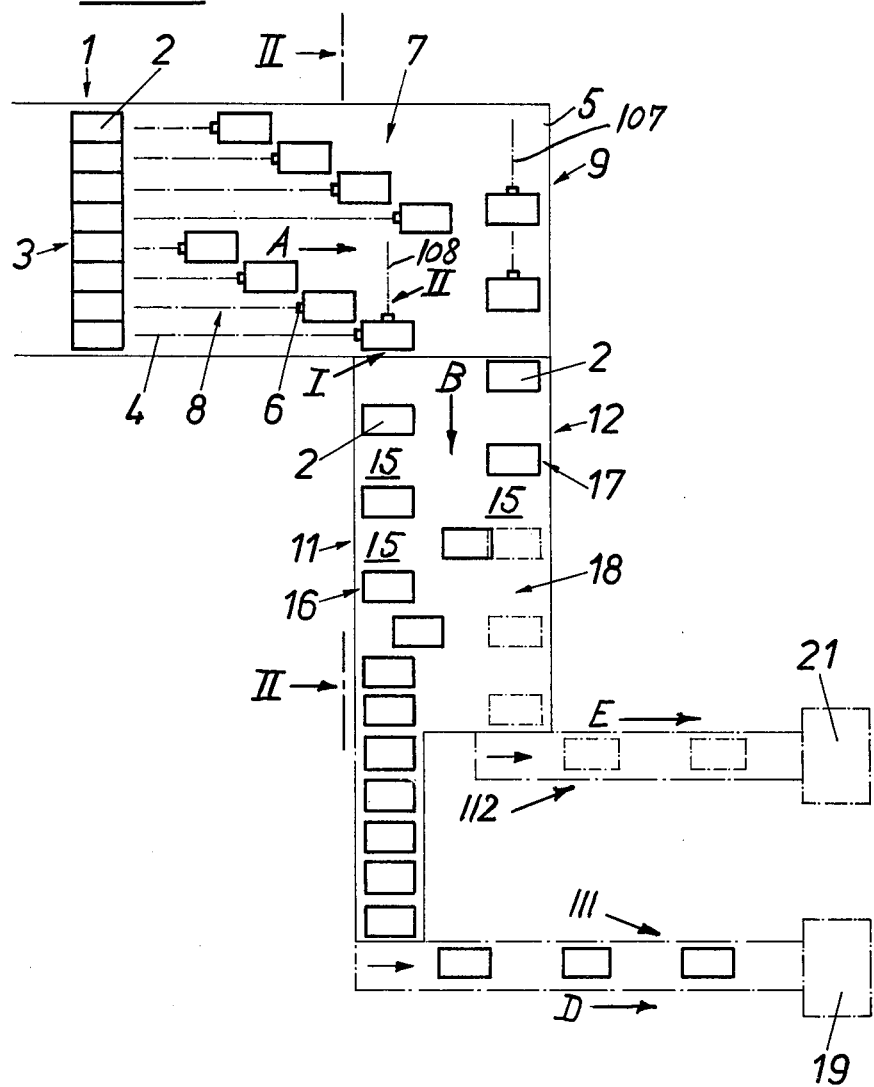

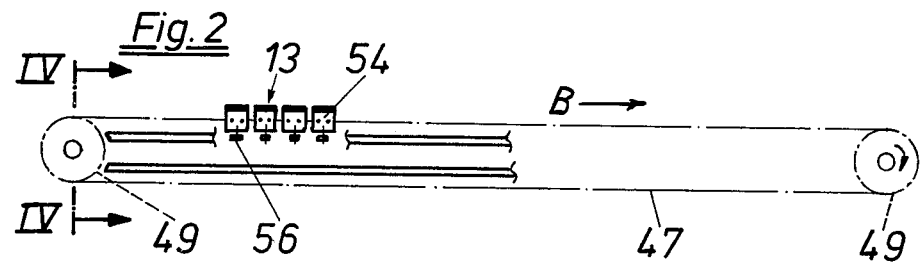
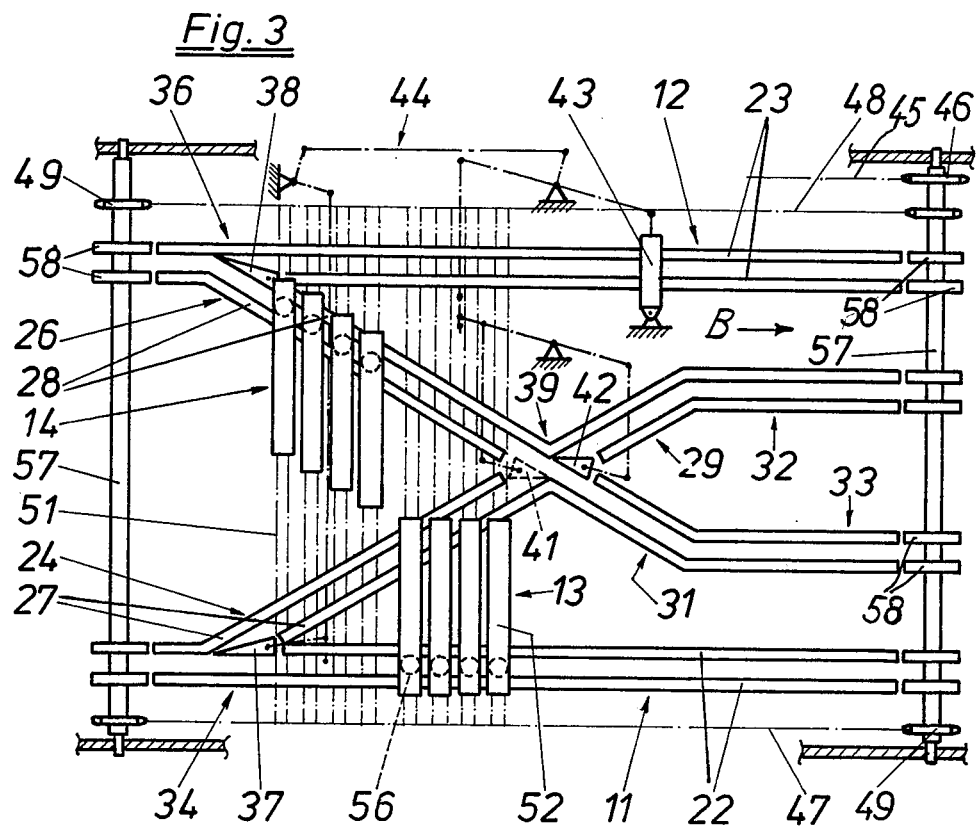
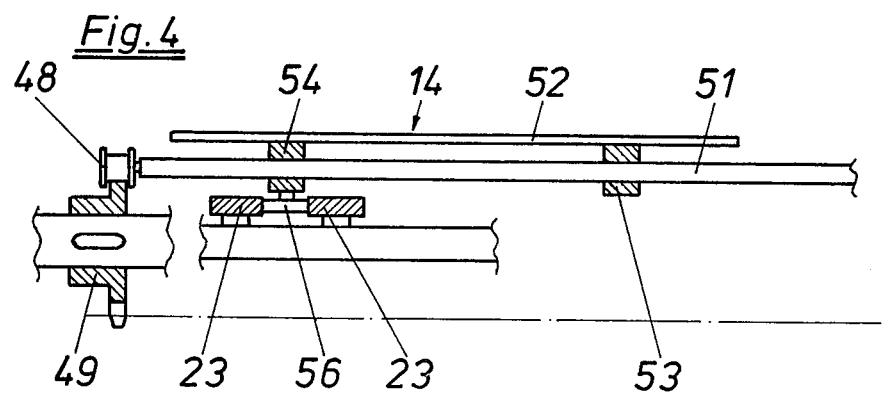

METHOD AND APPARATUS FOR TRANSPORTING STACKS OF PAPER SHEETS OR THE LIKE BETWEEN PRODUCING AND PROCESSING MACHINES

BACKGROUND OF THE INVENTION

The present invention relates to a method and apparatus for transporting and otherwise manipulating sheets, especially discrete stacks of paper sheets or the like, between producing and processing machines, for example, between a single producing machine and several processing machines. More particularly, the invention relates to improvements in a method and apparatus for transporting stacks of paper sheets or the like from a producing machine which turns out rows of aligned stacks to at least one of several processing machines, especially packing machines for discrete stacks or for assemblies or arrays of two or more stacks.

Sheets or leaves of the type used for the making of note books, pads and like commodities are obtained by subdividing large sheets of paper into smaller sheets. Modern apparatus (production lines) for mass-production of such commodities employ devices which sever large sheets lengthwise and transversely, and the apparatus further embody means for assembling the thus obtained smaller sheets or leaves into rows of stacks which are ready for transport to processing machines, especially to packing machines. Such mode of making smaller sheets and of assembling smaller sheets into stacks contributes significantly to the output of the apparatus. In many instances, the capacity of a producing machine is sufficiently high to warrant its connection with several processing machines. It has been found that the conveyor systems which are used in presently known apparatus of the above outlined character are not entirely satisfactory, especially in the event of temporary stoppage of a processing machine, because the conveyors cannot properly transport the entire output of the producing machine. Consequently, stacks of sheets which are intended for delivery to the arrested processing machine accumulate in the region between the producing and processing machines and are likely to obstruct the transport of stacks to the running processing machine or machines or to interfere with removal of all stacks of successively produced rows from the producing machine. As a rule, the conveyors transport stacks along several paths, each of which terminates at the receiving station of a discrete processing machine.

OBJECTS AND SUMMARY OF THE INVENTION

An object of the invention is to provide a novel and improved method of manipulating sheets, particularly discrete stacks of paper sheets, during transport between a producing machine and several processing machines (e.g., packing machines) in such a way that the producing machine need not be arrested as a result of breakdown of a processing machine.

Another object of the invention is to provide a novel and improved method of shuffling (when necessary) stacks of sheets during transport between a producing machine and several processing machines.

A further object of the invention is to provide a method which renders it possible to avoid piling-up of stacks of paper sheets or the like during transport between a lesser number of producing machines and a greater number of processing machines irrespective of whether or not all of the processing machines are in use.

An additional object of the invention is to provide a novel and improved method of preventing (i.e., eliminating the need for) complete stoppage of a production line for stacks of paper sheets or the like in the event of temporary breakdown of one or more machines which together constitute the production line.

A further object of the invention is to provide a novel and improved apparatus for the practice of the above outlined method.

An additional object of the invention is to provide an apparatus which can process large quantities of stacked sheets per unit of time and which need not be brought to a complete stop in the event of failure of one or more of its constituents.

Another object of the invention is to provide the apparatus with novel and improved means for shuffling stacks of paper sheets or the like in the event of breakdown of a processing machine.

A further object of the invention is to provide the apparatus with novel and improved conveyors each of which can transport stacks of paper sheets along any one of several paths, depending on the number of active processing machines.

Another object of the invention is to provide an apparatus which can constitute a production line for the making, transport and processing (especially packing) of discrete stacks of paper sheets or the like.

One feature of the invention resides in the provision of a method of transporting sheets, particularly discrete stacks of sheets which consist of paper or the like, from a producing machine to a plurality of processing machines (especially packing machines) which include a first and a second processing machine. The method comprises the steps of converting successive rows of sheets into discrete files of sheets wherein the neighboring sheets are separated from each other by gaps each of which is wide enough to receive a sheet (the files include a first file whose sheets are destined for processing in the first processing machine and a second file whose sheets are destined for processing in the second processing machine), transporting the sheets of each file along discrete elongated paths (each of which may be substantially L-shaped) having substantially parallel portions (such portions may be defined by two parallel tracks) and terminating at the respective processing machines, staggering the sheets of the first file with respect to the sheets of the second file so that each sheet of the first file which advances along the aforementioned portion of the respective path is in register with a gap between the sheets which form part of the second file and advance along the aforementioned portion of the respective path, and shifting the sheets of one of the first and second files sideways from the respective path into the registering gaps of the other of the first and second files on stoppage of the processing machine which normally receives the sheets of the one file. This shifting step can be said to involve or constitute a shuffling of sheets which form the first and second files.

The method preferably further comprises the step of reducing the output of the producing machine so as to enable the active processing machine or machines to accept all sheets of the files while the rate at which the sheets are processed in the active processing machine or machines remains constant or substantially unchanged. If the producing machine normally furnishes sheets for transport to two processing machines of identical capacity, the output reducing step preferably includes cutting the output of the producing machine in half.

The aforementioned shifting or shuffling step preferably takes place substantially simultaneously with stoppage of a processing machine so that the transition from operation with all processing machines to operation with a lesser number of processing machines does not necessitate any, even short-lasting, stoppage of the producing machine.

As a rule, the number of sheets in a row will be a whole multiple of the number of processing machines, and the converting step then preferably includes breaking up each row into equal groups of sheets, one group for each processing machine. For example, each row which is turned out by the producing machine may comprise eight aligned stacks of sheets. If the processing machine supplies stacks of sheets to two processing machines, each group of stacks consists of four stacks. The aforementioned converting and staggering steps can be carried out simultaneously, i.e., the sheets of one file are staggered with respect to the sheets of another file while a row of sheets is being converted into several files. Such breaking up preferably involves moving the sheets of a row in a direction at right angles to the longitudinal direction of the row, and the conversion into files can be effected by changing the direction of transport of sheets through 90 degrees so that the sheets begin to advance in parallelism with the longitudinal direction of the next-following row or rows.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic plan view of an apparatus which constitutes a production line for stacks of paper sheets and embodies the invention;

FIG. 2 is a schematic side elevational view of the shuffling or shifting means between the producing and processing machines of the production line, substantially as seen in the direction of arrows from the line II—II of FIG. 1;

FIG. 3 is a plan view of the shuffling means; and

FIG. 4 is a fragmentary sectional view as seen in the direction of arrows from the line IV—IV of FIG. 2.

DESCRIPTION OF THE PREFERRED EMBODIMENTS

Referring first to FIG. 1, there is shown a production line including a producing machine having a stack gathering or collecting station 1, two processing machines 19 and 21 each of which may constitute a packing machine for discrete stacks 2 or for assemblies or arrays of two or more stacks, and a transporting system which serves to advance stacks 2 from the gathering station 1 to the machine 19, to the machine 21 or to the machines 19 and 21. As mentioned hereinabove, the producing machine may include devices which sever large sheets lengthwise and transversely so that each large sheet yields a plurality of smaller sheets or leaves, e.g., leaves having a format which is required for the making of note books, other types of pads and analogous stationery products. In the embodiment which is shown in FIG. 1, the producing machine turns out a series of rows 3 each consisting of eight aligned stacks 2. The arrangement is such that the longer sides of neighboring stacks 2 are adjacent to each other. The exact details of the producing machine form no part of the invention. A suitable producing machine is marketed by the assignee of the present application.

The transporting system which serves to advance stacks 2 from the gathering station 1 to the packing machine 19 and/or 21 includes several units the first of which includes eight conveyors 4, one for each stack 2 of a row 3, and serves to remove the stacks 2 from the gathering station 1 while simultaneously converting each row 3 into two groups 7 and 8 each consisting of four stacks 2. The stacks 2 of each of these groups are staggered with respect to each other, as considered in the longitudinal direction of the conveyors 4. Each of the conveyors 4 may comprise an endless belt or chain which travels below a platform 5 and has one or more entraining portions or pushers 6 which extend through a slot in the platform 5 to engage and advance the respective stack 2 of a row 3 in the direction indicated by arrow A during travel with the upper reach of the respective belt or chain. The pushers 6 of neighboring conveyors 4 are staggered with respect to each other, as considered in the direction indicated by arrow A, to thereby convert the respective set of four aligned stacks 2 into a group 7 or 8.

The first unit (conveyors 4) of the transporting system delivers groups 7 and 8 to a direction changing or reorienting station 9 where the stacks 2 begin to move sideways as indicated by the arrow B. The stacks 2 of successive groups 8 are converted into a single file 16 by a first auxiliary conveyor 108, and the stacks 2 of successive groups 7 are converted into a single file 17 by a second auxiliary conveyor 107. The conveyors 107, 108 are similar or analogous to the conveyors 4. The arrangement is such that the width of clearances or gaps 15 between successive stacks 2 of the file 16 or 17 at least equals but preferably exceeds the width of a stack 2 (as measured in the direction indicated by arrow B), and that a clearance or gap 15 between two neighboring stacks 2 of the file 16 registers with a stack 2 of the file 17, and vice versa.

The second unit of the transporting system for stacks 2 is shown in detail in FIGS. 2, 3 and 4. This unit includes two parallel main ways or tracks 11, 12 for the respective files 16, 17 and two sets of reentrant conveyors 13, 14 which respectively serve to normally advance stacks 2 along the tracks 11 and 12. The conversion of groups 8, 7 into files 16, 17 is achieved by appropriate synchronization of movement of conveyors 4 with movement of auxiliary conveyors 108, 107, i.e., an entraining element of the conveyor 108 reaches the locus I when the lowermost conveyor 4 of FIG. 1 delivers a stack 2 to the same locus so that the conveyor 108 can begin to advance the stack in the direction indicated by arrow B, the next entraining element of the conveyor 108 reaches the locus II when the next-to-the-lowermost conveyor 4 of FIG. 1 delivers a stack 2 to the same locus, and so forth. The same applies for the entraining elements of the conveyor 107 and the corresponding conveyors 4.

Each conveyor 13 or 14 is a composite pallet (two shown in FIG. 3) which can transport at least one fully assembled stack 2 of paper sheets or the like. The main tracks 11 and 12 flank a shuffling or shifting station 18 for devices which enable the stacks 2 of the file 16 to move into alignement with the stacks of the file 17 or the stacks of the file 17 to move into alignment with the stacks of the file 16, depending upon whether or not the packing machine 19 or 21 is out of commission or is deactivated for other reasons.

In normal operation, successive conveyors 13 of the first set will run along the track 11 to receive successive stacks 2 of the file 16 from the conveyor 108 and to deliver such stacks to a third unit 111 of the transporting system. The unit 111 delivers stacks 2 to the packing machine 19. Successive conveyors 14 of the second set run along the track 12 and receive successive stacks of the file 17 from the auxiliary conveyor 107. The conveyors 14 deliver successive stacks 2 to a fourth unit 112 of the transporting system for delivery to the packing machine 21. In the illustrated embodiment, the directions (arrows D and E) in which the stacks 2 are transported by the units 111 and 112 make a right angle with the longitudinal directions of the tracks 11 and 12. This reduces the space requirements (especially the overall length) of the production line. However, it is equally within the purview of the invention to use the tracks 11 and conveyors 13 for delivery of stacks 2 which form the file 16 directly to the packing machine 19 and/or to use the tracks 12 and conveyors 14 for delivery of stacks 2 which form the file 17 directly to the packing machine 21.

FIG. 3 shows that the main tracks 11 and 12 respectively comprise pairs of parallel guide rails 22 and 23 which extend in the direction indicated by arrow B. The shuffling or shifting station 18 further comprises two substantially V-shaped connecting tracks 24 and 26 which respectively include pairs of guide rails 27 and 28. The track 24 can guide the conveyors 13 from the track 11 into close proximity of the track 12, and the track 26 can guide the conveyors 14 from the track 12 into close proximity of the track 11. The track 24 includes a diagonally extending section 29 and a second section 32 which latter is parallel to the tracks 11 and 12. Analogously, the track 26 comprises a diagonally extending section 31 and a second section 33 which latter is parallel to the section 32. The diagonal sections 29, 31 intersect each other at a crossing 39. The junction 34 between the track 11 and the diagonal section 29 of the track 24 includes a pivotable switch 37, and the junction 36 between the track 12 and the diagonal section 31 includes a pivotable switch 38. Two pivotable switches 41, 42 are installed at the crossing 39. The switches 37, 38, 41, 42 are movable between different positions by an apparatus including a motor here shown as a double-acting pneumatic cylinder and piston unit 43 and a linkage 44 whose elements are indicated by phantom lines.

As mentioned above, each of the conveyors 13 and 14 is a pallet. These conveyors are respectively driven by two endless conveyors 47 and 48 here shown as chains trained over sprocket wheels 49. The right-hand sprocket wheels 49 of FIG. 3 are mounted on a horizontal shaft 57 which is rotated by a suitable prime mover (e.g., a variable-speed electric motor, not shown) through the medium of a further chain 45 and a sprocket wheel 46. The chains 47 and 48 are not directly connected with the respective conveyors 13, 14; instead, the links of these chains are coupled with transversely extending motion transmitting rods 51 (see particularly FIG. 4). Pairs of neighboring rods 51 support elongated strip-shaped portions or platforms 52 of the respective conveyors 13, 14. Each conveyor 13 or 14 is assembled of four parallel strip-shaped portions 52. The portions 52 carry pairs of bearing elements 53, 54 (see FIG. 4) which are slidable lengthwise of the respective motion transmitting rods 51, and each bearing element 54 supports a roller follower 56 which is disposed between the rails of a track. The roller follower 56 which is shown in FIG. 4 is guided by the rails 23 of the track 12. The shafts 57 for the two sets of sprocket wheels 49 carry pairs of disk-shaped guide members 58 for the roller followers 56. A pair of guide members 58 registers with each end of the track 11, with each end of the track 12, with the free end of the section 32 and with the free end of the section 33. A second set of tracks which are mirror images of tracks shown in FIG. 3 is provided at a level below the shafts 57, 58 to return the conveyors 13, 14 to positions of register with the auxiliary conveyors 108, 107 so that the conveyors 13, 14 can accept fresh stacks 2 as soon as they advance around the left-hand shaft 57 of FIG. 3 and reach the level of the station 9. The switches which are associated with the lower set of tracks are operated with appropriate delay following actuation of the switches shown in FIG. 3. The transfer of stacks 2 from the auxiliary conveyors 108, 107 onto the portions 52 of conveyors 13, 14 takes place during travel of conveyors 13, 14 along the left-hand portions of tracks 11, 12 toward the shuffling station 18.

The distance between the central longitudinal vertical symmetry planes of the tracks 11, 12 equals or exceeds the combined width of two stacks 2 (as considered at right angles to the longitudinal directions of the tracks 11 and 12).

The chains 47, 48 and the motion transmitting rods 51 therebetween perform several functions, namely, they move the first set of conveyors (13) along the path defined by the main track 11 and the second set of conveyors (14) along the main track 12; they establish gaps between neighboring conveyors 13 as well as between neighboring conveyors 14; and they maintain the conveyors 13 in register with the gaps between the conveyors 14 and vice versa. This insures that successive conveyors 13 of the first set can enter (when necessary) the gaps between the conveyors 14 of the second set when the roller followers 56 of the conveyors 13 are caused to travel along the path which is defined by the connecting track 24, and that successive conveyors 14 can enter the gaps between the conveyors 13 when the roller followers 56 of the conveyors 14 are caused to travel along the path which is defined by the connecting track 26.

The operation is as follows:

When the packing machines 19 and 21 are operative, the conveyors or pallets 13 deliver successive stacks 2 of the file 16 to the unit 111 which delivers the stacks to the packing machine 19. At the same time, the conveyors or pallets 14 deliver successive stacks 2 of the file 17 to the unit 112 which delivers the stacks to the packing machine 21. The switches 37 and 38 are held in those positions in which the roller followers 56 of portions 52 of pallets 13 are confined to movement between the rails 22 and the roller followers 56 of portions 52 of pallets 14 are confined to movement between the rails 23 (while the respective pallets travel with the upper reaches of the chains 47 and 48). The switch 37 of FIG. 3 is shown in that position in which it prevents successive roller followers 56 from entering the space between the rails of the diagonal section 29. In other words, the switches 37 and 38 prevent the pallets 13 and 14 from respectively travelling along the paths which are defined by the connecting tracks 24 and 26.

If one of the packing machines 19, 21 is arrested, one chamber of the cylinder in the motor 43 receives pressurized fluid and the other chamber is free to communicate with the atmosphere. The piston rod of the motor 43 causes the linkage 44 to change the positions of certain switches. For example, if the machine 21 is out of commission, the linkage 44 will cause the switches 38, 41 and 42 to assume the positions which are shown in FIG. 3 while the position of the switch 37 remains unchanged. Thus, the pallets 13 continue to travel along the path which is defined by the track 11 but the pallets 14 are caused to leave the track 12 at the junction 36 and to travel along the path which is defined by the connecting track 26. This means that each pallet 14 approaches the track 11 during travel along the path portion defined by the diagonal section 31 and is sufficiently close to the track 11 when its roller followers 56 advance between the rails of the section 33 to insure that a stack 2 thereon is in line with the stacks 2 which are carried by the neighboring pallets 13. In other words, successive stacks 2 of the file 17 enter successive gaps 15 of the file 16, and successive stacks of the shifted file 17 alternate with successive stacks of the file 16. The switches 41 and 42 at the crossing 39 prevent the roller followers 56 of the pallets 14 from entering the section 29, i.e., the roller followers 56 of the pallets 14 are compelled to remain between the rails of the track 26. It will be recalled that the bearing elements 53 and 54 of each pallet portion 52 are movable lengthwise of the respective motion transmitting rods 51, i.e., the pallets 14 are free to move sideways during travel of their roller followers 56 between the rails 28 of the track 26. The speed of pallets 14 in the direction indicated by arrow B remains unchanged. When a roller follower 56 reaches the end of the track 26, it enters the space between the corresponding disk-shaped guide elements 58 and thereupon the space between the adjacent rails of a track forming part of the aforementioned lower set of tracks below the shafts 57 to return into register with the space between the guide elements 58 at the left-hand ends of the rails 23 not later than when the corresponding pallet portion 52 begins to travel about the left-hand shaft 57 of FIG. 3 on its way toward the upper reach of the chain 48. The corresponding pallet 14 then receives a stack 2 from the oncoming entraining element of the auxiliary conveyor 107 (i.e., a stack of the group 7) and moves the stack sideways during travel of its roller followers 56 between the rails 28. It will be noted that the portions 52 of conveyors or pallets 14 carry roller followers 56 at their upper ends and that the portions 52 of pallets 13 carry roller followers 56 at their lower ends, as viewed in FIG. 3. This enables the stacks 2 on successive pallets 14 to move into exact register with the stacks 2 of the file 16 when the roller followers 56 of successive pallets 14 travel between the rails of the section 33.

When the pallets 14 are caused to move along the path which is defined by the track 26, all stacks 2 are delivered to the packing machine 19. If the latter is incapable of processing the entire output of the producing machine which furnishes rows 3 of stacks to the gathering station 1, the speed (and output) of the producing machine is reduced, preferably to 50 percent of the normal operating speed, so that the machine 19 can readily process the entire output of the decelerated producing machine.

When the cause of malfunction of the packing machine 21 is eliminated, the motor 43 returns the switch 38 to the position in which the pallets 14 are compelled to travel along the entire path which is defined by the track 12. At the same time, the producing machine is accelerated to normal operating speed so that one half of its output is processed by the machine 19 and the other half by the machine 21.

If the machine 19 is out of commission, the switch 38 remains in normal position but the position of switches 37, 41 and 42 is changed so that the pallets 13 are compelled to travel along the path which is defined by the track 24 and thereby shuffle the stacks 2 thereon with the stacks of the file 17. Again, the speed of the producing machine is preferably reduced by 50 percent so that the machine 21 is capable of processing the entire output of the decelerated producing machine. The just mentioned mode of operation (decelerating the producing machine when the machine 19 or 21 is arrested) is advisable and necessary when the output of each packing machine is constant or cannot be increased by 100 percent.

It is clear that the linkage 44 constitutes but one form of means for changing the positions of switches 37, 38, 41 and 42 in order to insure that the pallets 13, 14 respectively travel along the paths defined by the tracks 11 and 12, 11 and 26 or 12 and 24. Also, the pneumatic cylinder and piston unit 43 constitutes but one form of motor means which can be used to deform the linkage 44. In actual practice, this linkage is more sophisticated than shown in FIG. 3 by phantom lines since its parts must be capable of changing the positions of switches 38, 41, 42 while the position of the switch 37 remains unchanged or of adjusting the switches 37, 41 and 42 while the position of the switch 38 remains unchanged. Electromagnetically operated switches can be used with equal advantage; the positions of such switches can be changed automatically in response to starting or stoppage of the machine 19 or 21.

It is further within the purview of the invention to employ tracks each of which includes a single rail and to provide the pallet portions 52 with pairs of roller followers which straddle the single rail of the selected track.

The diagonal sections 29, 31 of the connecting tracks 24, 26 need not intersect each other, i.e., the track 24 can be installed downstream of the track 26 (or vice versa), as considered in the direction indicated by arrow B. However, the construction which is shown in FIG. 3 is preferred at this time because it contributes to compactness of the shuffling station 18. Furthermore, it is not necessary to employ parallel main tracks 11 and 12; these tracks can converge or diverge. However, the provision of two parallel main tracks and the provision of two intersecting connecting tracks between such main tracks has been found to greatly reduce the space requirements of the station 18.

To a certain degree, the manner in which the stacks of the file 17 are transferred into the path for the stacks of the file 16 or vice versa resembles the manner in which the two rows of coupling elements in a slide fastener are converted into a single row in response to movement of the slider in a direction to close the slide fastener. The only important difference is that, in the event of stoppage of a processing machine, the stacks 2 of one file need not move sideways during sidewise movement of the stacks which form the other file.

The mounting of each pallet portion 52 on several motion transmitting rods 51 is desirable and advantageous because it insures that the sheet-supporting surfaces of all portions 52 of a pallet 13 or 14 are disposed in a common plane during travel of pallets with the upper reaches of the respective chains 47, 48. The same result can be achieved if each pallet portion is mounted on a single rod 51 which has a polygonal or other non-circular outline and extends through complementary bores or holes in the respective bearing elements 53 and 54. The provision of two bearing elements 53, 54 for each pallet portion 52 is desirable and advantageous because the pallet portions are less likely to jam during sidewise movement along the associated rods 51. However, the same result (absence of jamming) can be achieved by using a single but relatively long bearing element for each pallet portion 52. The mounted of roller followers 56 on those bearing elements of pallets 13 which are remote from the pallets 14 (and vice versa) is desirable because the roller followers of two adjoining pallets 13, 14 cannot interfere with each other during transfer of stacks of the file 17 into the gaps 15 between the stacks of the file 16 or vice versa.

It is further within the purview of the invention to replace the substantially V-shaped connecting tracks 24 and 26 with straight diagonally extending connecting tracks each of which extends from the track 11 and all the way to the track 12. Such modified construction would necessitate the provision of additional switches at the locations where the downstream ends of the tracks respectively merge into the tracks 12 and 11 and a different mounting of roller followers 56 (e.g., at the centes of the respective pallet portions 52). A pallet 13 which has been moved onto the main track 12 during the interval of idleness of the respective packing machine 19 is returned into register with the main track 11 (by the respective track of the lower set of tracks) during travel with the lower reach of the chain 47. The same applies for the pallets 14 in the event of malfunction of the machine 21.

The fact that the portions 52 of a pallet 13 or 14 which travels along the track 24 or 26 are slightly staggered with respect to each other is of no consequence, especially if the sheets of the stacks 2 are relatively stiff or if each stack 2 includes two relatively stiff covers of the type normally used in note books or the like.

An important advantage of the improved method and apparatus is that, by the simple expedient of reducing the speed of the producing machine, one of a plurality of processing (packing) machines can process the entire output of the producing machine in the event of malfunction of the other processing machine or machines. Furthermore, the transition from operation with a single processing machine to operation with plural processing machines (or vice versa) does not necessitate complete stoppage of the producing machine, i.e., the latter can continue to furnish rows 3 of stacks 2 to the gathering station 1 when the number of active processing machines is changed. A further important advantage of the apparatus is that the shuffling station 18 occupies little room and that the devices at this station are simple, rugged and reliable so that the apparatus requires a minimum of maintenance.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. Apparatus for transporting sheets, especially stacks of paper sheets, from a station which receives rows of aligned sheets to a plurality of processing machines including a first and a second machine, comprising elongated first and second main tracks for transport of sheets toward the respective machines; first and second sets of successive reentrant conveyors; drive means including means for respectively moving the conveyors of said first and second sets along the associated tracks in directions toward the respective machines, for maintaining the conveyors of each set in spaced-apart positions so that the neighboring conveyors of each set define gaps and for maintaining the conveyors of said first set in register with the gaps between the conveyors of said second set; additional conveyor means for transporting the sheets of successive rows from said station to successive conveyors of said first and second sets; a first connecting track extending from said first main track toward said second main track so as to enable successive conveyors of said first set to move in their entirety into the gaps between the conveyors of said second set and to thereby move the respective sheets into exact register with the sheets on the conveyors of said second set; a second connecting track extending from said second main track toward said first main track so as to enable successive conveyors of said second set to transfer sheets into the gaps between the conveyors of said first set and into exact register with the sheets on the conveyors of said first set, said connecting tracks crossing each other, each of said tracks comprising at least one guide rail and said first and second connecting tracks including portions which are substantially parallel to said main tracks, said portion of said first connecting track being adjacent to said second main track and said portion of said second connecting track being adjacent to said first main track; and first and second junctions between said first and second main tracks and the respective connecting tracks.

2. Apparatus as defined in claim 1, wherein said main tracks are parallel to each other and a second portion of each connecting track extends substantially diagonally between said main tracks.

3. Apparatus as defined in claim 1, further comprising mobile switches at said junctions and at the crossing between said connecting tracks.

4. Apparatus as defined in claim 1, wherein each conveyor of said first and second sets constitutes a pallet.

5. Apparatus as defined in claim 4, wherein each of said pallets comprises a plurality of portions which are movable relative to each other in directions substantially normal to the respective main tracks.

6. Apparatus as defined in claim 5, wherein said main tracks are substantially parallel to each other and said moving means includes motion transmitting members extending transversely of said main tracks and slidably supporting said portions of said pallets.

7. Apparatus as defined in claim 6, wherein said portions of said pallets include follower means which track the guide rails of selected tracks.

8. Apparatus as defined in claim 1, wherein said main tracks are substantially parallel to each other and said moving means comprises two endless flexible elements having first reaches above said tracks and second reaches below said tracks, means for driving said flexible elements so as to move said first reaches toward the respective machines, and motion transmitting rods connected to said flexible elements, extending transversely of said main tracks and slidably supporting the conveyors of said first and second sets.

9. Apparatus as define in claim 8, wherein said flexible elements are chains and each conveyor of said first and second sets comprises a plurality of discrete portions, each portion of each of said conveyors being slidably supported by at least one of said rods and each of said rods supporting a different conveyor portion.

10. Apparatus as defined in claim 9, wherein each of said conveyor portions is slidably supported by a plurality of neighboring motion transmitting rods.

11. Apparatus as defined in claim 9, wherein each of said conveyor portions comprises a plurality of bearing elements which are slidable along the respective rods, one bearing element of each conveyor portion including follower means which tracks the selected rails.

12. Apparatus as defined in claim 11, wherein said one bearing element of each conveyor of said first set is located in that region of the respective conveyor which is remote from said second main track and said one bearing element of each conveyor of said second set is located in that region of the respective conveyor which is remote from said first main track.

* * * * *